United States Patent [19]

Sukenari et al.

[11] Patent Number: 4,614,987
[45] Date of Patent: Sep. 30, 1986

[54] MODE SELECTION DEVICE OF A TAPE DECK

[75] Inventors: Akira Sukenari, Aichi; Isao Hasegawa, Tokyo; Yukio Ito, Saitama, all of Japan

[73] Assignee: Clarion Co., Ltd., Tokyo, Japan

[21] Appl. No.: 683,744

[22] Filed: Dec. 19, 1984

[30] Foreign Application Priority Data

Dec. 22, 1983 [JP] Japan ............................ 58-204726[U]

[51] Int. Cl.⁴ ........................ G11B 15/00; G11B 17/00
[52] U.S. Cl. ........................................ 360/93; 360/69; 360/90; 360/96.3
[58] Field of Search ................... 360/93, 90, 69, 96.1, 360/96.3

[56] References Cited

U.S. PATENT DOCUMENTS 4,570,190  2/1986  Kitoh ..................... 360/93

*Primary Examiner*—John H. Wolff
*Attorney, Agent, or Firm*—Flynn, Thiel, Boutell & Tanis

[57] ABSTRACT

A mode selection device of a tape deck includes a power cam driven by a drive gear, a power plate moved by the power cam, first pin formed on the power plate, a key plate configured to engage the first pin when an attraction solenoid attracts a plunger plate and disengage it otherwise, a head plate linked to and concurrently movable with the key plate via a key plate link, a reverse link pivoted by second pin formed on the power plate; and a reverse link responsive to the movement of the head plate to engage or disengage third pin formed on the reverse link. The device is characterized in that the power plate is limited in its withdrawal when the plunger plate is attracted by the solenoid, and in the limited withdrawal of the power plate, the power cam is maintained at an angular position where a non-toothed portion of the power cam is opposed to the drive gear, so that the on and off action of the solenoid in combination with the different positions of the head plate establishes plural tape transport modes.

3 Claims, 5 Drawing Figures

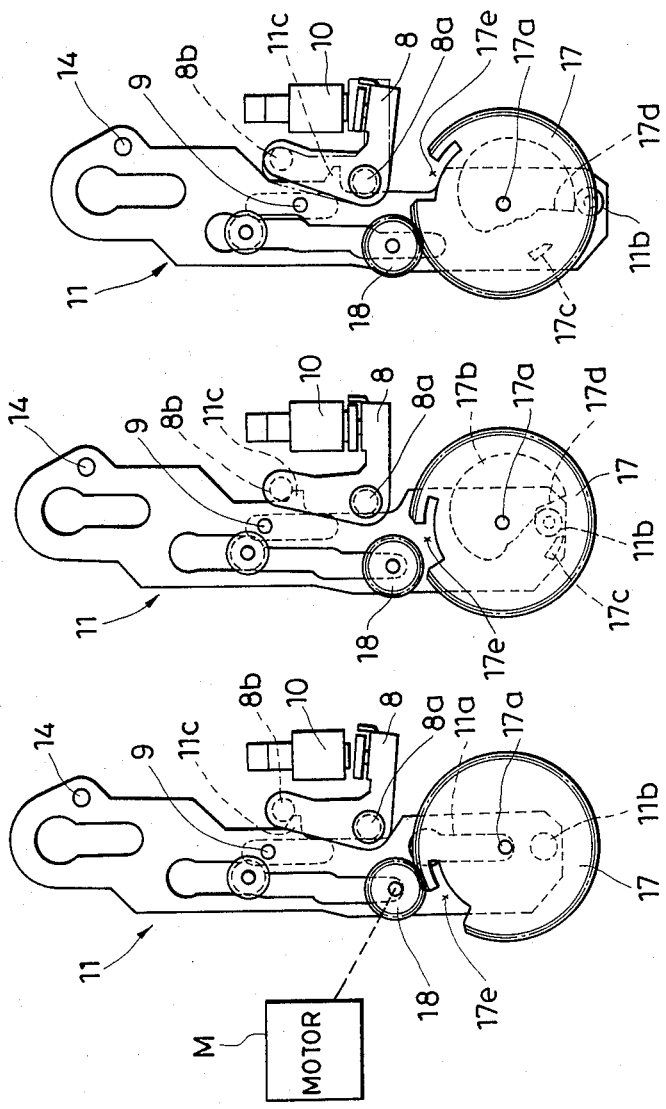

MODE SELECTION DEVICE OF A TAPE DECK

FIELD OF THE INVENTION

This invention relates to a mode selection device of a tape deck.

BACKGROUND OF THE INVENTION

In a tape recording and reproducing apparatus, various functions (such as establishment of the play mode, switching action of an auto reverse mechanism, etc.) are controlled by energization and deenergization of a corresponding number of solenoids. In this regard, the number of solenoids in a tape player tends to increase, and this increase elevates the fabrication cost of the tape player. Additionally, with increase of solenoids, the schedule arrangement for timely energizing or deenergizing the respective solenoids becomes extremely important because a small error in the timing will untimely drive or stop a gear.

OBJECT OF THE INVENTION

It is therefore an object of the invention to provide a mode selection device of a tape deck capable of selecting at least three modes by on and off control of a single solenoid.

SUMMARY OF THE INVENTION

The inventive device is characterized in that various combinations of the on-off modes of a single solenoid with different positions of a head plate establish at least three modes of tape run of a tape deck in a tape recorder. More specifically, in accordance with the present invention, there is provided a mode selection device of a tape deck comprising:
- a drive gear driven by a motor of the tape deck;
- a power cam having a non-toothed portion and intermittently rotated by said drive gear;
- a power plate reciprocated by rotation of said power cam;
- a single attraction solenoid;
- a plunger plate pivotable to and away from said attraction solenoid;
- first pin formed on said power plate;
- a key plate engageable with said first pin when said plunger plate is attracted by said attraction solenoid and otherwise disengageable from said first pin;
- a key plate link pivotably connected to said key plate;
- a head plate connected to and concurrently movable with said key plate via said key plate link;
- second pin formed on said power plate;
- a reverse link pivotably moved by said second pin;
- third pin formed on said reverse link;
- a reverse plate responsive to the position of said head plate to engage or disengage said third pin;
- a projection formed on said power plate to limit the movement of said power plate when said plunger plate is attracted by said attraction solenoid and otherwise release the limitation; and
- a guide formed on said power cam to cause said power cam to be maintained at an angular position whereat said non-toothed portion faces said drive gear when said projection limits the movement of said power plate.

The invention will be better understood with the description given below, referring to a preferred embodiment illustrated.

BRIEF DESCRIPTION OF THE DRAWINGS

The drawings are plan views of a mode selection device embodying the invention wherein:

FIG. 3 shows the aspect of a power plate at the time when a solenoid is deenergized;

FIG. 4 shows the aspect of the power plate at the time when the solenoid is energized; and FIG. 5 shows the aspect of the power plate which has been pulled up by a power cam.

DETAILED DESCRIPTION OF THE PREFERRED EMBODIMENT

Figure 1:
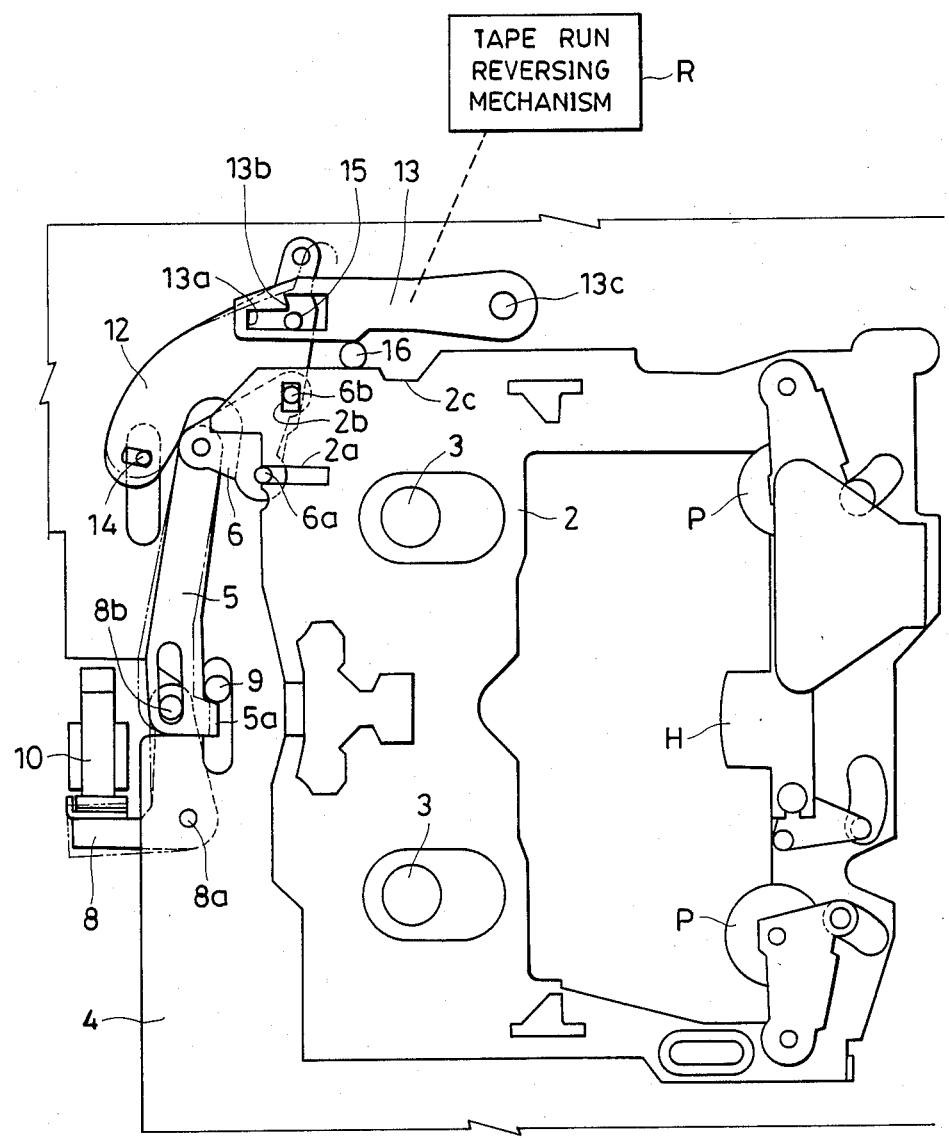
FIG. 1 shows the aspect at the time when a head plate is located at its inoperative position.

Referring to FIG. 1 which is a plan view showing major parts of a tape deck 1, reference numeral 2 designates a head plate movable in the right and left in the Figure. The head plate 2 carries at the right end portion thereof pinch rollers P, a reproduction head H, etc.

Reference numeral 3 denotes reel shafts engageable with reel hubs of a tape cassette not shown and rotatable by a known drive mechanism provided behind a chassis 4. The reel shafts 3 take fixed positions and never move to the right nor left.

Figure 2:
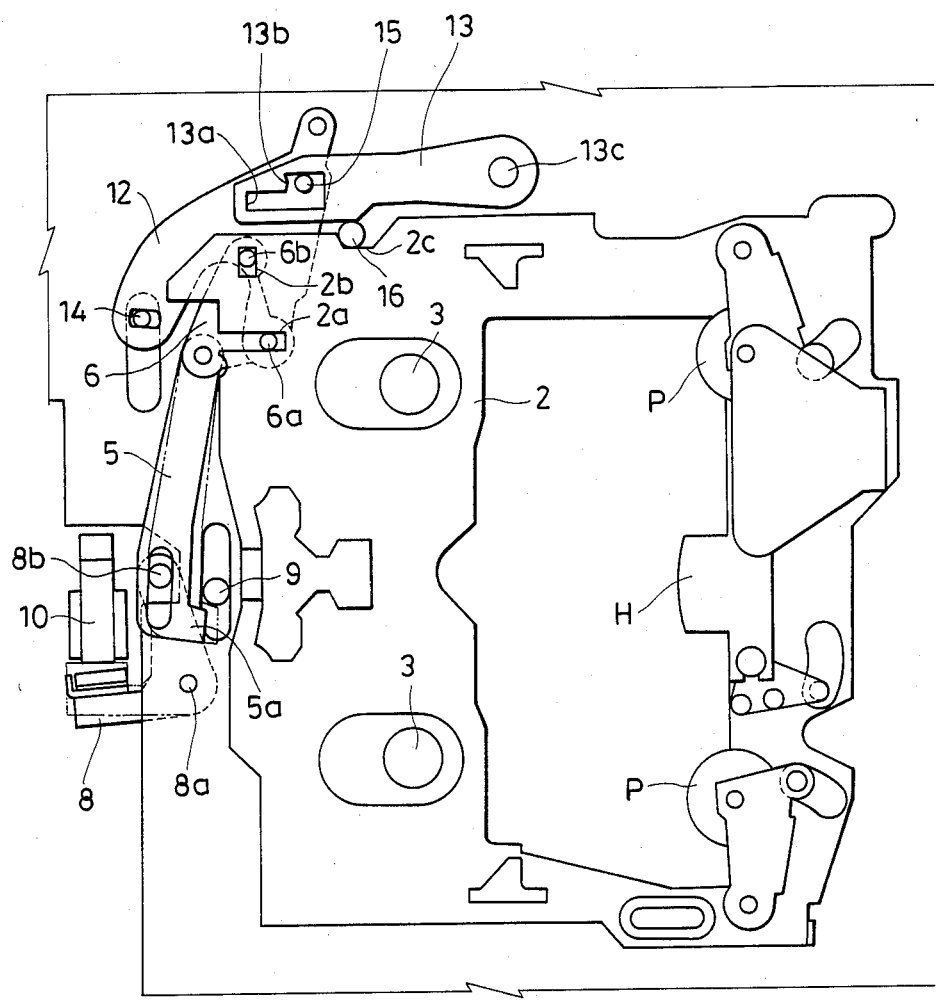
FIG. 2 shows the aspect at the time when the head plate is located at its operative position.

Reference numeral 5 designates a key plate which is connected to the head plate 2 via a key plate link 6 pivotable about an axle 6a, so that as the key plate 5 moves downward, the key plate link 6 is rotated, elevating the head plate 2 to the left as shown in FIG. 2 (This position is hereinafter called "operative position".) The head plate 2 has formed a hole 2b receiving a pin 6b and a groove 2a allowing the axle 6a to escape thereinto.

Reference numeral 8 denotes a plunger plate pivotably supported by a pin 8a. One end of the plunger plate 8 is pivotably connected to the key plate 5 so that an engagement member 5a of the key plate 5 is brought into engagement with a pin 9 when the plunger plate 8 is attracted by an attraction type solenoid 10, and is disengaged from the pin 9 when the plunger plate 8 is released (The key plate 5 is biased to the left in the Figures by a spring not shown so that it is automatically rotated away from the pin 9 upon removal of the attractive force of the solenoid 10). The pin 9 moves up and down together with a power plate 11 (which will be described later, referring to FIGS. 3 through 5) so that when the pin 9 slides downward while keeping engagement with the key plate 5, the head plate 2 is elevated to the left in the Figures via the key plate link 6.

Reference numeral 12 denotes a reverse link pivotably mounted about the axle 6a. One end of the reverse link 12 is pivotably connected to a pin 14 formed on the power plate 11, so that when the pin 14 is moved downward by the power plate 11, a pin 15 formed on the reverse link 12 moves to the left in the Figures.

Reference numeral 13 designates a reverse plate having an engagement hole 13a with a step-in portion 13b. The engagement hole 13a receives therein the pin 15 of the reverse link 12, so that the reverse plate 13 moves to the left in the Figures with a downward movement of the pin 14 while the pin 15 engages the step-in portion 13b within the hole 13a, but does not move regardless of said movement of the pin 14 while the pin 15 is located otherwise. The reverse plate 13 governs the rotatable directions of the various members related to the tape transport on the tape deck 1. One reciprocation of the reverse plate 13 in the right and left directions causes a known tape transport reverting mechanism to change the tape transport direction from the forward mode to the reverse mode or vice versa. The reverse plate 13 is biased downward in the Figures by a spring not shown.

Reference numeral 16 denotes a switch pin biased downward in the Figure by a spring not shown. The switch pin 16 changes the position of the reverse plate 13 between the position of FIG. 1 and the position of FIG. 2 in the following manner. When the head plate 2 is pulled to the left in the Figures (to the operative position), the switch pin 16 enters into a recess 2c formed in the head plate 2 as shown in FIG. 2. The reverse plate 13 biased downward by a resilient member not shown is then allowed to rotate downward in the Figures about a pin 13c so that the step-in portion 13b engages the pin 15. With this engagement, the reverse plate 13 can reciprocate in the right and left directions together with the reverse link 12 and changes the tape player from the forward mode to the reverse mode or vice versa. It should be noted that when the switch pin 16 does not enter the recess 2c (namely, when it is inoperative), the reverse plate 13 is elevated by the switch pin 16 as shown in FIG. 1 so as to disengage the step-in portion 13b from the pin 15, thereby maintaining the tape transport mode unchanged.

Referring now to FIGS. 3 through 5, the power plate 11 is explained in detail. The power plate 11 is slidably mounted behind the chassis 4. The pin 9 secured to the power plate 11 (projecting from the back face of the power plate for up and down movement together with the power plate 11) moves the key plate 5 up and down as shown in FIGS. 1 and 2.

The vertical movement of the power plate 11 is done in the following manner. Below the power plate 11 is mounted a power cam 17 which is pivotably supported to the chassis 4 by an axle 17a. (To this end, the power plate 11 has formed a groove 11a shown in FIG. 3 for permitting the axle 17a to escape thereinto during the vertical movement of the power plate 11.) The power plate 11 is rotated by a drive gear 18 engaging therewith. (The drive gear 18 is driven by a motor M of the tape deck 1 via a known link system which is not explained here.)

The power cam 17 has formed on the back force thereof a cam 17b engageable with a cam follower 11b fixed to the power plate 11. With rotation of the power cam 17, the cam follower 11b fitting the cam contour is pushed downward together with the power plate 11. As the power plate 11 gradually moves downward by a predetermined angle with rotation of the power cam 17, the cam follower 11b reaches a cutoff portion 17d and disengages from the cam 17b, so that the power plate 11 is returned to its original position by a spring not shown. The lowest position the power plate 11 takes due to pressure of the power cam 17 is shown in FIG. 5.

The power plate 11 has formed a projection 11c engageable with a pin 8b formed on the plunger plate 8. The projection 11c disengages the power cam 17 from the drive gear 18 in the following manner. When the plunger plate 8 is attracted by the solenoid 10 as shown in FIG. 4, the pin 8b moves toward the power plate 11 and limits the downward movement of the power plate 11. More specifically, the power plate 11 is movable downward simply by a smaller distance in FIG. 4 than that in the primary stage of FIG. 3. Therefore, the cam follower 11b enters between the cam 17b and a guide 17c opposed to the cam 17b and places the power cam 17 at the angular position of FIG. 4 whereat the drive gear 18 faces a non-toothed portion 17e of the power cam 17 and does not transmit the rotation to the power cam 17.

The inventive device operates as follows. It should be noted here that this embodiment can select four tape transport modes by powering in and off the solenoid 10 basically in combination with the different positions of the head plate 2. The respective combinations are hereunder described.

(1) First combination comprises the head plate 2 in the inoperative position of FIG. 1 and the solenoid 10 energized. The projection 11c withdraws with movement of the power plate 11 responsive to rotation of the power cam 17 and permits the full movement of the plunger plate 8. Thus the plunger plate 8 is rotated to the left as shown in FIG. 5 and is attracted by the solenoid 10. (The plunger plate 8 is biased to the left by a spring not shown.) As the result, the key plate 5 is rotated to the right so that the plunger plate 8 engages the pin 9 as shown by the solid line in FIG. 1.

As the power cam 17 continues to rotate, pushing the power plate 11 downward, the key plate 5 is pulled downward by the pin 9 (secured to the power plate 11), so that the head plate 2 is pulled up by the key plate link 6 to the position of FIG. 2. This may be the play mode, for example. The head plate 2 which was once pulled up is maintained there by a known mechanism not shown. Therefore, nevertheless the pin 9 returns to the position of FIG. 1 with a further rotation of the power cam 17, the head plate 2 keeps the position of FIG. 2.

(2) Second combination comprises the head plate 2 in the inoperative position (or on the way to the operative position) and the solenoid 10 deenergized. When the solenoid 10 is deenergized while the head plate 2 is on the way to the operative position of FIG. 2, the key plate 5 is disengaged from the pin 9 (brought to the position shown by the solid line in FIG. 2) and allows the head plate 2 to return to the inoperative position of FIG. 1. (The head plate 2 is biased to the right by a spring not shown.)

When the solenoid 10 is deenergized in the state of FIG. 4 whereat the drive gear 18 does not engage the power cam 17, the power plate 11 is returned to the position of FIG. 3 by a resilient force. (The power plate 11 is biased upward by a spring not shown). At that time, since the cam follower 11b compels the power cam 17 to rotate until it engages driver gear 18 as shown in FIG. 3.

(3) Third combination comprises the head plate 2 in the operative position of FIG. 2 and the solenoid 10 energized. It is the premise of this state that the head plate 2 is at the elevated position of FIG. 2 by the rotation of the power cam 17. As the power cam 17 further rotates from this state, the power plate 11 is restricted in movement by the pin 8b. (That is, the power plate 11 does not move higher than the position of FIG. 4.) Therefore, the power cam 17 stops at the angular position of FIG. 4 whereat the cam follower 11b enters between the cam 17b and the guide 17c. Since the drive gear 18 disengages from the power cam 17 in the state of FIG. 4, this configuration is maintained unless the solenoid 19 is deenergized.

(4) Fourth combination comprises the head plate 2 in the operative position of FIG. 2 and the solenoid 10 deenergized. The key plate 5 does not move regardless of the up and down movement of the power plate 11. However, the reverse link 12 is rotated about the axle 6a by the pin 14 secured to the power plate 11. Since the head plate 2 is in the left position and the switch pin 16 is in the groove 2c, the pin 15 of the reverse link 12 engages the step-in portion 13b of the reverse plate 13. Therefore, the reverse plate 13 is moved in the right and left directions with the pivotal movement of the reverse link 12, and this movement of the reverse plate 13 activates a known tape run reversing mechanism R linked thereto to change the tape transport direction.

In the above-described manner, by use of a single solenoid, the embodiment can establish, different modes, namely, pulling up the head plate 2, switching between the forward and reverse modes, cancelling the meshing engagement between the drive gear 18 and the power cam 17, and restoring the head plate 2 on the way to the operative position of FIG. 2 to the inoperative position of FIG. 1.

Nevertheless the illustrated embodiment shows a tape deck, the invention may be employed in any other type of tape recording and reproducing apparatus.

As described above, the invention has the excellent feature that a single solenoid can establish three modes of the tape player, namely pulling up the head plate, switching between the forward and reverse modes, and interrupting the engagement between the drive gear and the power cam. Therefore, the number of solenoids employed to select various modes of the tape player can be reduced as compared to the prior art device. This not only decreases the fabrication cost of the tape player but also simplifies the on and off timing between the solenoids, thereby improving the reliability of the device.

The embodiments of the invention in which an exclusive property or privilege is claimed are defined as follows:

1. A mode selection device for a tape deck including:
   a drive gear to be driven by a motor and comprising:
   a power cam having a non-toothed portion and intermittently rotated by the drive gear;
   a power plate reciprocated by rotation of said power cam;
   a plunger plate pivotable toward and away by action of a solenoid;
   first pin formed on said power plate;
   a key plate engageable with said first pin when said plunger plate is attracted by said solenoid and otherwise disengageable from said first pin;
   a key plate link pivotably connected to said key plate;
   a head plate connected to and concurrently movable with said key plate via said key plate link;
   second pin formed on said power plate;
   a reverse link pivotably moved by said second pin;
   third pin formed on said reverse link;
   a reverse plate responsive to the position of said head plate to engage or disengage said third pin;
   a projection formed on said power plate to limit the movement of said power plate when said plunger plate is attracted by said solenoid and otherwise released for movement; and
   a guide formed on said power cam to cause said power cam to be maintained at an angular position whereat said non-toothed portion faces said drive gear when said projection limits the movement of said power plate.

2. A device of claim 1 wherein said reverse plate has formed an engagement hole including a step-in portion to receive said third pin.

3. A device of claim 1 wherein said reverse plate is linked to a tape transport reversing mechanism of the tape deck.

* * * * *